Figure 1:
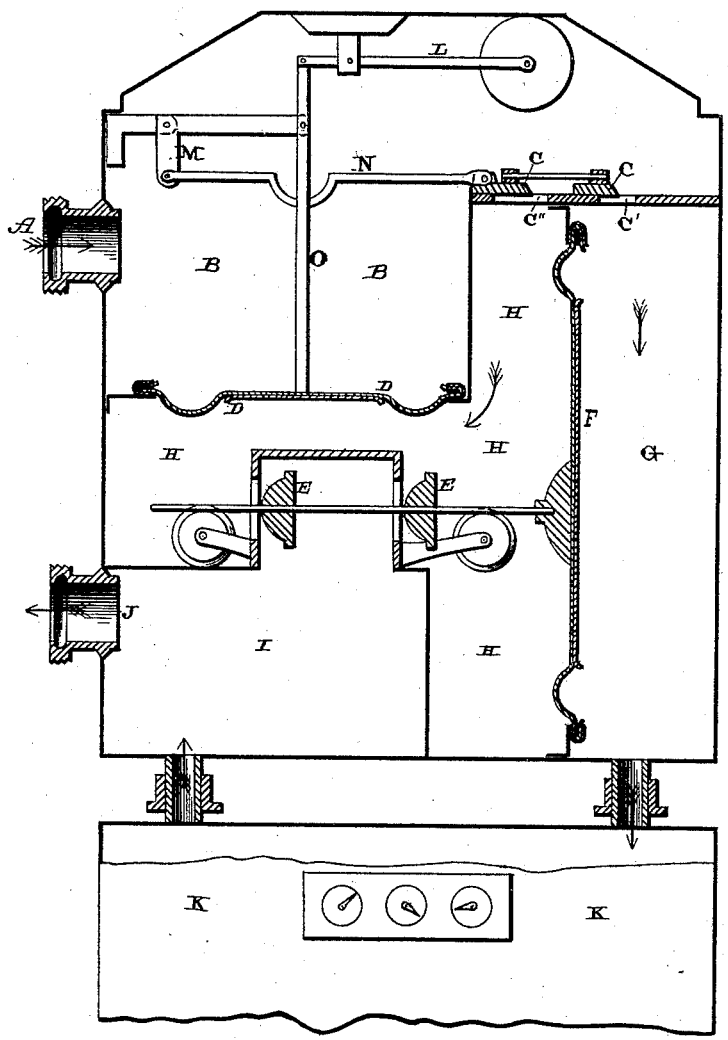

(No Model.)　　　　　F. E. YOUNGS.　　　2 Sheets—Sheet 1.
PROPORTIONAL METER.

No. 413,121.　　　　　Patented Oct. 15, 1889.

Witnesses:
E. P. Ellis,
J. W. Nesbit

Inventor:
Fred E. Youngs,
per F. A. Lehmann,
Atty.

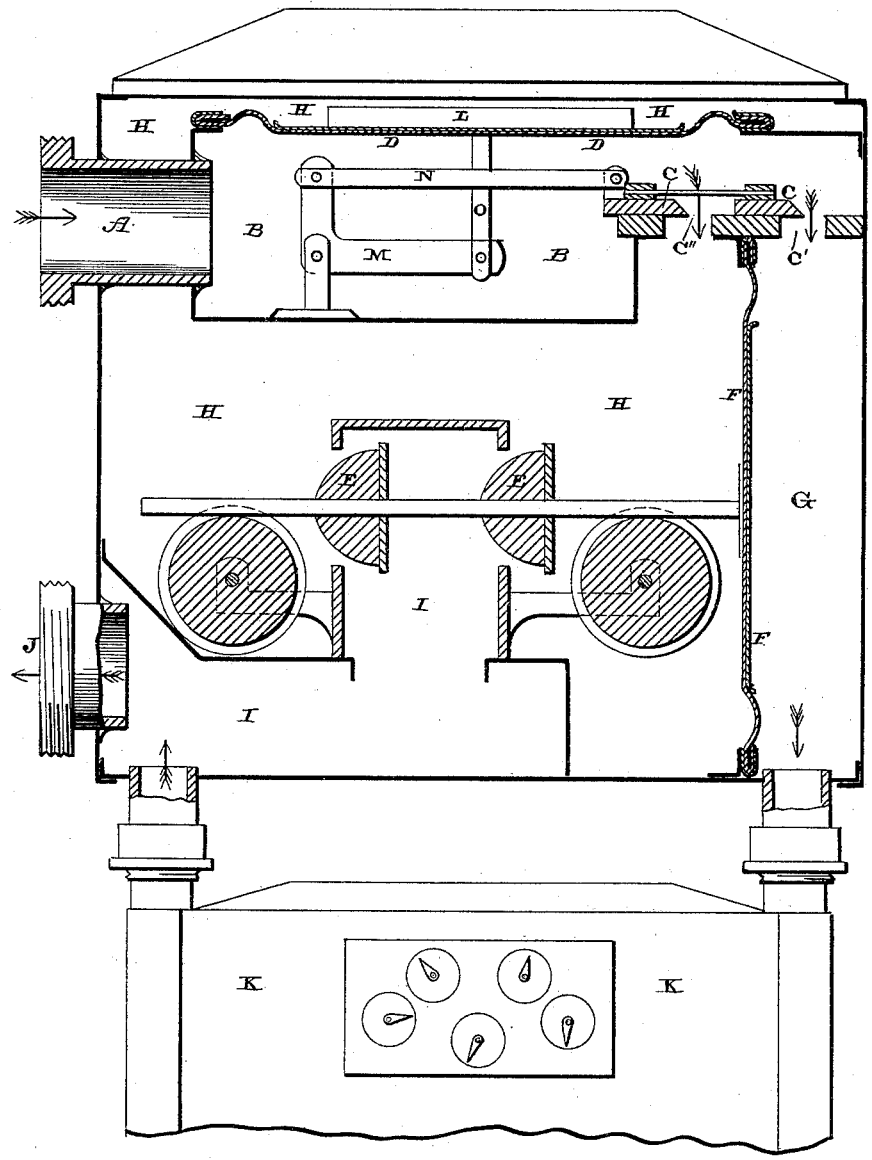

UNITED STATES PATENT OFFICE.

FRED E. YOUNGS, OF PITTSBURG, PENNSYLVANIA.

PROPORTIONAL METER.

SPECIFICATION forming part of Letters Patent No. 413,121, dated October 15, 1889.

Application filed May 29, 1889. Serial No. 312,497. (No model.)

*To all whom it may concern:*

Be it known that I, FRED E. YOUNGS, of Pittsburg, in the county of Allegheny and State of Pennsylvania, have invented certain new and useful Improvements in Proportional Meters; and I do hereby declare the following to be a full, clear, and exact description of the invention, such as will enable others skilled in the art to which it pertains to make and use it, reference being had to the accompanying drawings, which form part of this specification.

My invention relates to an improvement in proportional meters; and it consists in the combination of an inlet-chamber, a proportional valve operated by a diaphragm, a pressure-equalizing valve also operated by a diaphragm, a tally-meter, and an outlet passage or chamber, all of which will be more fully described hereinafter.

The object of my invention is to provide a proportional meter which will accurately maintain the ratio between the measured and unmeasured portions of the gas without regard to changes of pressure or changes of volume or amount of flow, (of course within the limits of the capacity of the meter,) and which will absorb but a very small amount of the flowing pressure of the gas or fluid.

In the drawings, Figure 1 is a sectional elevation of a meter embodying my invention. Fig. 2 is a modification of the same.

The accuracy of proportional meters may be said to depend almost entirely on keeping the ratio between the measured and unmeasured portions of the gas or fluid constant or invariable. In proportional meters as usually constructed a serious difficulty has been encountered in maintaining this ratio, owing to the fact that the friction in the tally-meter is a variable quantity, sometimes more and sometimes less, changing with the different conditions of pressure and volume of gas or fluid flowing through the meter. Many ways have been suggested for overcoming this difficulty; but the objection to the most of them lies in the fact that they cause the device or meter to absorb too much of the pressure of the gas or fluid in passing through it.

A is the inlet-pipe; B, the inlet-chamber; C, a proportional valve; D, the diaphragm which operates the proportional valve; E, a balance-valve operated by the diaphragm F; G, the tally-meter feeding-chamber; H, the chamber into which the unmeasured gas flows; I, the outlet-chamber; J, the outlet-pipe; K, the tally-meter. In operation the gas or fluid enters through the inlet-pipe A into the inlet-chamber B, where a small but definite portion of the gas or fluid flowing through the device passes through the small opening of the proportional valve C into the meter-feeding chamber G. Thence it passes through the tally-meter K to the outlet-chamber I. The larger portion of the gas passes from the inlet-chamber B through the larger opening C″ in the proportional valve C into chamber H, and thence through the balance-valve E to the outlet-chamber I, where it again mingles with the measured portion of the gas and leaves the device through the outlet-coupling J.

The diaphragm D in Fig. 1 is counterweighted in any suitable manner, or, as here shown, by the lever and ball L, or, as shown in Fig. 2, the diaphragm is placed at the top of the inlet-chamber above the levers M and rods N and O. This diaphragm is connected to the proportional valve of any preferred form or construction by the bell-crank lever M and the connecting-rods N O. The pressure of the gas in the inlet-chamber B has a tendency to press down in Fig. 1 or up in Fig. 2, and by the action of the lever M to open the proportional valve C. This action is resisted by the action of the lever and weight L, Fig. 1, or weight L, Fig. 2. When the valve C is opened by the pressure of the gas in the chamber B, a portion of the pressure of the gas passes through into the chambers H and G. The pressure in the chamber H, combined with the action of the weight L, balances the pressure in the chamber B; but the pressure in the chamber H will be less than the pressure in the chamber B by an amount depending on the size or weight of the weight L. The pressure of the portion of the gas which passes through the small opening C′ in the proportional valve into the meter K is backed up or throttled by the friction of the meter, which throttles or obstructs the flow of the gas or fluid; or, in other words, if the friction of the meter K were, say, one-fourth of an inch water-pressure the pressure in the chamber G would be higher than in the chamber I by one-fourth inch.

If it were not for the action of the diaphragm F and balance-valve E the pressure in the chambers I and H would be the same; or, in other words, the fall in pressure of the gas or fluid in passing through the two openings C' C'' in the proportional valve C would be unequal. The fall in pressure of the gas or fluid in passing from the chamber B into the chambers H and I would be more than the fall in pressure in passing from the chamber B into the chamber G by the amount of the friction of the tally-meter K, which in the case supposed above was one-fourth inch. Now the pressure of the gas in the chamber G, pressing against the diaphragm F, has a tendency to close the balance-valve E, while the pressure in the chamber H on the other side of the tally-meter K and diaphragm F acts to open the balance-valve E, while the friction of the tally-meter K, throttling or backing up the pressure into the chamber G, has a tendency to make it higher than the chamber H. The excess of pressure in the chamber G crowds the diaphragm F over and closes or partially closes the balance-valve E. This has the effect of throttling the flow of the gas or fluid from the chamber H into the chamber I until the pressure in the chamber H becomes the same as the pressure in the chamber G. The diaphragm F is hung in any suitable manner, so as to move the valve E back and forth with as little friction as possible. If it were mechanically possible to operate this balancing-diaphragm F and the balancing valve E with absolutely no friction, the pressure in the chambers H and G would be at all times and under all conditions of flow absolutely the same. Then the diaphragm D and proportional valve C could be dispensed with and an opening made from the chamber B into the chamber H of a certain size and an opening made from the chamber B into chamber G of any other suitable size smaller than the opening into the chamber H. The flow of the gas then from the chamber B into the chambers H and G would always be in the ratio of the areas of these two openings; but owing to the fact that there will always be more or less friction the motion of the diaphragm F and the balance-valve C will cause a very minute difference in the pressure in the chambers H and G. In case of a very small flow or volume passing through the device the fall in pressure in passing from the chamber B into the chamber H and G might become so small that the error in balancing the pressure in the chambers H and G by the diaphragm F and the balance-valve E would exceed the fall in pressure through the orifices between the chamber B and chambers H and G. This being the case, the gas or fluid would either flow all through the chamber H to the outlet I and none pass through the meter K, or in case the error was the other way the whole volume might pass through the chamber G and meter K. Now it is only necessary to insure enough fall in pressure in passing from the chamber B into the chambers H and G to make this minute error a small factor of the total fall in pressure through the valve C. The volume of gas in passing through an orifice with differing falls of pressure varies about as the square root of the fall in pressure. This being the case, if the fall in pressure in passing from the chamber B into the chamber H is a certain definite amount and the fall in pressure in passing from the chamber B into the chamber G is the same minus or plus the error due to the friction of the diaphragm F and the balance-valve E, the error caused in the flow into the two chambers will vary as the square root of the fall in pressure in passing into the chambers. I have found that it is perfectly practical to keep the pressure in the chambers H and G within one one-hundredth of an inch water-pressure of each other. This being the case, the actual fall in pressure in passing from the chamber B into the chambers H and G may be made very low.

Having thus described my invention, I claim—

The combination, in a proportional meter, of an inlet-chamber, a balance-chamber, a meter-feeding chamber, an outlet-chamber, a counterweighted diaphragm placed between the inlet-chamber and the balance-chamber, a proportional valve placed with the large opening leading to the balance-chamber, and the small opening leading to the meter-feeding chamber and operated by the counterweighted diaphragm, a balance-valve placed between the balance-chamber and the outlet-chamber, a diaphragm placed between the meter-feeding chamber and the balance-chamber and operating the balance-valve, and a tally-meter placed or connected between the meter-feeding chamber and the outlet-chamber, substantially as shown.

In testimony whereof I affix my signature in presence of two witnesses.

FRED E. YOUNGS.

Witnesses:
J. M. KEYSER,
C. F. HOLDSHIP.